UNITED STATES PATENT OFFICE.

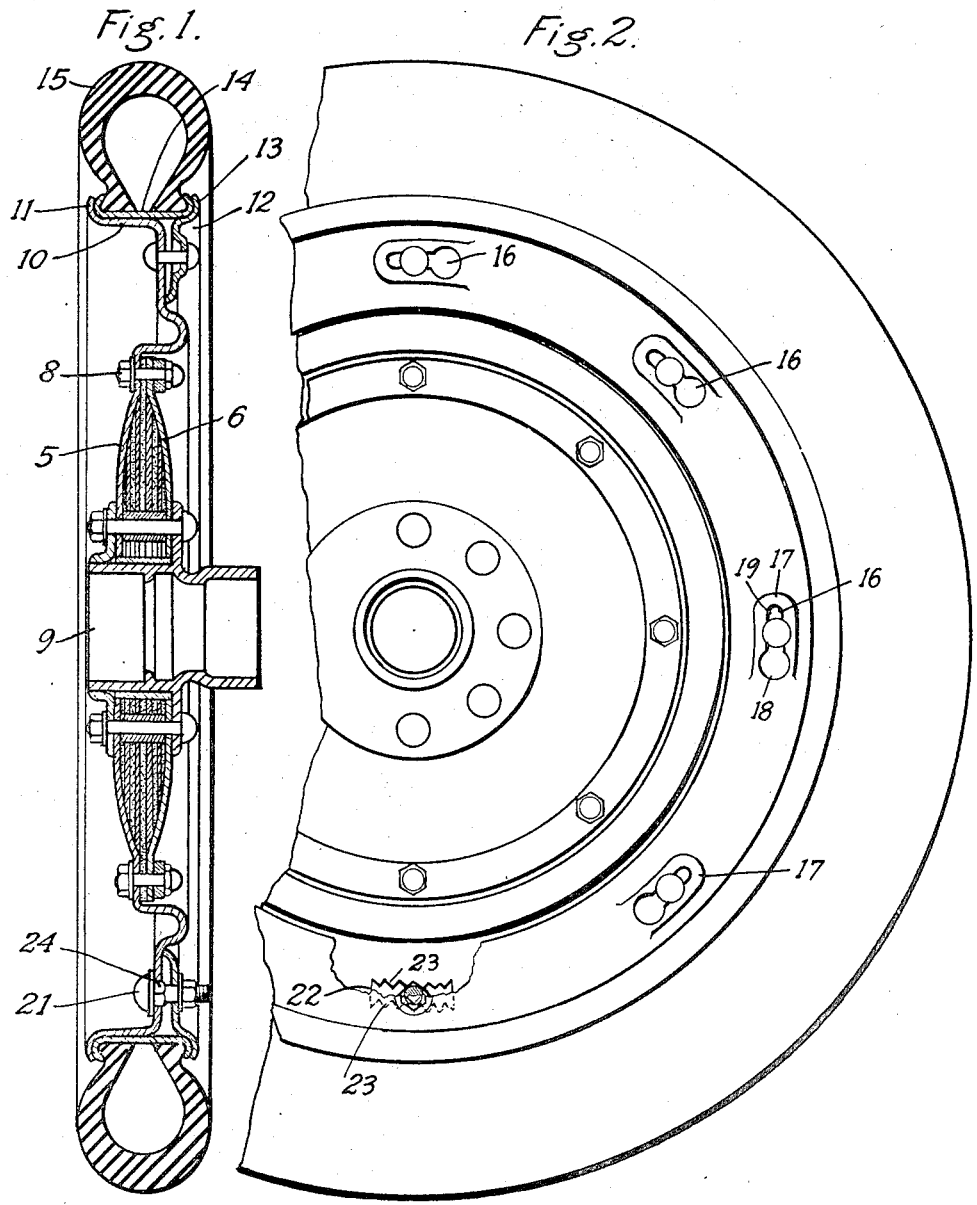
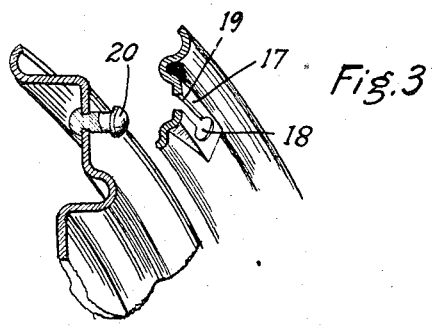

DAVID H. BELLAMORE, OF NEW YORK, N. Y., AND THOMAS I. S. BOAK, OF EAST ORANGE, NEW JERSEY; SAID BOAK ASSIGNOR TO SAID BELLAMORE.

RIM CONSTRUCTION FOR PRESSED STEEL WHEELS.

1,422,408.　　　Specification of Letters Patent.　　Patented July 11, 1922.

Application filed August 22, 1919. Serial No. 319,129.

*To all whom it may concern:*

Be it known that we, DAVID H. BELLAMORE, a subject of the King of Great Britain, residing in the city of New York, borough of Manhattan, county and State of New York, and THOMAS I. S. BOAK, a citizen of the United States, residing at East Orange, county of Essex, and State of New Jersey, have invented a certain new and useful Improved Rim Construction for Pressed Steel Wheels, of which the following is a specification.

This invention relates to pressed steel vehicle wheels, but is more particularly directed to an improved rim construction, whereby the tire of the wheel may be more easily and expeditiously positioned on or removed from the wheel.

The object of the invention is primarily to provide a construction wherein the tire retaining ring of the rim is made quickly and easily detachable from the permanent portions of the wheel through the co-operation of pin and slot connections positioned at spaced intervals circumferentially of the ring and adapted to be locked in engaged condition at a single point in the circumference thereof.

A further object of the invention is the simplification of the rim construction in a pressed steel wheel for the purpose of minimizing weight, and yet, with all, producing a firm and rigid support for the tire.

In prior steel wheel construction it has been the practice to secure the detachable ring to the permanent part of the rim by bolts positioned at spaced intervals around the ring. With such a construction the changing of the tire due to puncture or blow-out, necessitates the unscrewing of a large number of bolts individually to remove the tire and the remanipulation of these bolts to secure the new tire in place. This is a long and arduous task, and through the acquirement of the present invention is entirely obviated, since, in the preferred embodiment of the invention, the ring is locked in position by a single bolt, the retaining ring being, nevertheless, held to the permanent portion of the rim at the same points as previously held by bolts and in the same positive and rigid manner. The invention thus embodies all of the advantages inherent in prior constructions, but is free from the disadvantages inherent therein.

Features of the invention other than those specified will be apparent from the hereinafter detailed description taken in conjunction with the accompanying drawings.

In the accompanying drawings we have illustrated one practical embodiment of the invention, but the construction therein shown is to be understood as illustrative only, and not as defining the limits of the invention.

Figure 1 is a central section of a wheel embodying the improved rim construction of this invention;

Figure 2 is a face view of the structure shown in Figure 1; and

Figure 3 is a fragmental section perspective of the rim elements, illustrating their manner of attachment to one another.

The rim construction of this invention may be adapted to various types of steel wheel, but for the purpose of illustration it is shown as incorporated in a wheel construction embodying a main disk 5 and a reenforcing disk 6 secured together by bolts 8 and mounted on a hub 9. Both disks are formed from pressed steel, but the disk 6 is made smaller in diameter than the disk 5 and serves to reenforce the latter which supports and spaces the rim from the hub.

In carrying out the present invention in a wheel of this character, preferably the wider section of the rim is formed on the outer periphery of the main disk 5 by providing thereon a flange 10, the lateral free edge of which is curled up at 11 to form one of the retaining beads of the rim. The other section of the rim is in the form of a retaining ring 12, the outer margin of which is curled up at 13 to form the second retaining bead adapted to co-operate with the bead 11 to hold a demountable rim 14 in position on the wheel. The demountable rim 14 is adapted to support the tire 15 in the old and well known manner. The flange 10 and the retaining ring 12 collectively constitute the fixed rim of the wheel, the flange 10 being permanently secured to the wheel, i. e., integral therewith, and the ring 12 being demountable to allow of the securing of the tire on or its removal from the wheel. The ring 12 is made of sufficient breadth, in a radial direction, to allow of the forming therein of a plurality of tapered slots 16 positioned at spaced distances about the ring and formed in inclined portions 17 which are pressed outwardly during the process of manufacture of said ring. The inclined portions are so formed that they have a gentle sweep from the outer face of the ring in an outward lateral direction, and all of them face in the same direction about the circumference of the ring, as clearly shown in Figure 2. The slot 16 of each inclined portion may be termed a tapered slot, in that that portion 18 of the slot at the base of the incline is enlarged while the remaining portion 19 of said slot is more or less constricted.

With the slots 16 in the inclined faces of the ring are adapted to co-operate attaching pins 20 which are mounted on the web of the disk 5 as shown in Figure 1 and detailed in Figure 3. These pins 20 are spaced at circumferential distances in said disk corresponding to the spaces of the slots 16 and preferably in the form of projecting rivets as shown in Figure 3. These rivets are rigidly mounted on the disk 5 and project laterally in the direction of the ring 12 with their heads spaced sufficiently from the adjacent face of the disk to allow them to be passed through the enlarged portions 18 of the respective slots, whereupon circumferential shifting of the ring 12 causes the rivets to enter the constricted portions 19 of the slots while their heads engage with the inclined faces 17 of the ring. Through this co-operative action between the inclined slots and pins 20, the ring may be easily and expeditiously positioned on or removed from the wheel to allow of the clamping of the demountable rim in place or its removal therefrom.

In order that the ring may be locked in position on the wheel in such manner as to preclude the jarring loose thereof during use, there is provided, at one point of its circumference, an aperture through which is adapted to be passed a bolt 21. This aperture in the ring is shaped to closely conform to the cross section of the bolt 21, but said bolt also passes through an elongated slot 22 in the web of the disk 5. The sides of the slot 22 are serrated or toothed at 23, and the bolt 21 is of the type normally referred to, in the trade as a carriage bolt. Such a bolt has a squared portion 24 at the base of its shank adjacent its head, and said squared portion is adapted to engage with the serrations 23 of the slot for the purpose of normally locking the bolt against lateral movement longitudinally of the slot.

In removing a demountable rim and tire from the wheel shown in Figure 1, the bolt 21 is first removed, whereupon the ring 12 may be shifted circumferentally to bring the slots of all of the pins 20 in juxtaposition with the large ends of the respective slots 16, for the purpose of permitting removal of the ring 12. The tire 15 with its demountable rim 14 is now withdrawn in the usual manner and a new demountable rim and tire positioned on the flange 10. The ring 12 is now picked up, placed in position to allow of the passing of the heads of all of the pins 20 through the enlarged ends of the slots 16, and the ring thereupon given circumferental movement to force the pins into the inclined constricted portions of the slots and clamp the demountable rim in place. The bolt 21 is next reinserted so that its squared portion 24 will engage with the serrations 23, and, when the nut of said bolt is tightened, the ring 12 will be rigidly locked to the web of the disk 5 and relative circumferential movement between these parts will be precluded.

It will thus appear that the present invention provides a rim of extremely simple construction and one wherein the removable portion thereof may be easily and expeditiously dismantled from and returned to the wheel through the manipulation of but a single bolt. The ring 12 will be held firmly to the permanent portion of the wheel rim at spaced intervals about its circumference by the pins 20, the head of each of which has wedging co-operation with the inclined slots to cause the ring to tightly grip the demountable rim. The parts are preferably constructed entirely of sheet metal, with the result that the fixed rim of the wheel is extremely light in weight and gyroscopic action, so common in prior wheels having heavy rims, is entirely absent here. The manufacturing problems are, moreover, simplified in a wheel of this construction and its cost minimized. There is but one loose part, namely, the bolt 21, all the other parts being permanent with the sections of the rim, and this fact not only simplifies the removal of the demountable rim from, or its return to the wheel, but overcomes the liability of losing the detachable parts when changing of the tire as is often required at night and on muddy or snow covered roads.

In the foregoing description and in the accompanying drawings, the pins or studs 21 are shown in the form of rivets headed over to secure them rigidly in position. It will be understood, however, that these studs may be in the form of bolts which are secured to the permanent portion of the rim and normally remain in the same rigid position as do the rivets shown. One advantage, however, of bolts, is that they may be more easily initially adjusted to give the proper fixed rim width, so that the gripping of a demountable rim of a predetermined size may be assured. For this reason, the invention is to be understood as not limited to the exact details shown, but is to be construed as covering equivalents, and as broadly novel as is commensurate with the appended claim.

Having thus fully described our inven- tion, what we claim as new and desire to secure by Letters Patent is:

As a new article of manufacture a wheel embodying a disc, the outer margin of which is bent laterally to form a fixed rim section, said disc being provided, adjacent the fixed rim section, with an annularly disposed slot, the inner and outer edges of which are serrated, a plurality of studs rigid with the disc and extending from one face thereof in an annular path, in combination with a ring member, the outer margin of which is bent laterally to form a removable rim section and which is provided with a plurality of inclined keyhole slots equal in number to the studs and similarly placed, whereby the ring member may be brought into position to cause all of the keyhole slots to receive the studs and thereafter rotate to tightly clamp the parts together, and a bolt provided with a polygonal portion adapted to extend through the slot in the disc and interfit with the serrated edges of said slot when said bolt is passed through said slot and through the aperture in the ring, for the purpose of locking the ring against retrograde rotation.

In testimony whereof, have signed our names to this specification.

DAVID H. BELLAMORE.
THOMAS I. S. BOAK.